United States Patent

[11] 3,618,056

[72] Inventors Reinhard Hurlimann
Granada Hills;
Willard J. Opocensky, Glendale, both of Calif.

[21] Appl. No. 887,414
[22] Filed Dec. 22, 1969
[45] Patented Nov. 2, 1971
[73] Assignee The Singer Company

[54] SPRING MOUNTING FOR FLYING MAGNETIC HEAD
2 Claims, 2 Drawing Figs.

[52] U.S. Cl. .......... 340/174.1 E, 179/100.2 P
[51] Int. Cl. .......... G11b 5/60, G11b 21/20
[50] Field of Search .......... 340/174.1 E; 179/100.2 P, 100.2 C

[56] References Cited

UNITED STATES PATENTS

| | | | |
|---|---|---|---|
| 3,197,751 | 7/1965 | Felts | 340/174.1 E |
| 3,140,362 | 7/1964 | Cheney | 340/174.1 E |
| 3,187,315 | 6/1965 | Cheney | 340/174.1 E |
| 3,368,210 | 2/1968 | Zimmer | 340/174.1 E |
| 3,528,067 | 9/1970 | Linsley et al. | 340/174.1 E |

*Primary Examiner*—James W. Moffitt
*Assistant Examiner*—Vincent P. Canney
*Attorney*—Linval B. Castle

ABSTRACT: A mounting for urging a flying magnetic head into close proximity with a rotating magnetic medium. The mounting includes a bifurcated leaf spring with tips that are bent to engage a V-slot in the top surface of the transducer bearing pad. A vertical pin, extending from the top surface of the bearing pad, engages the slot between the tines of the bifurcated spring to prevent the disengagement of the transducer from the spring.

Figure 1:
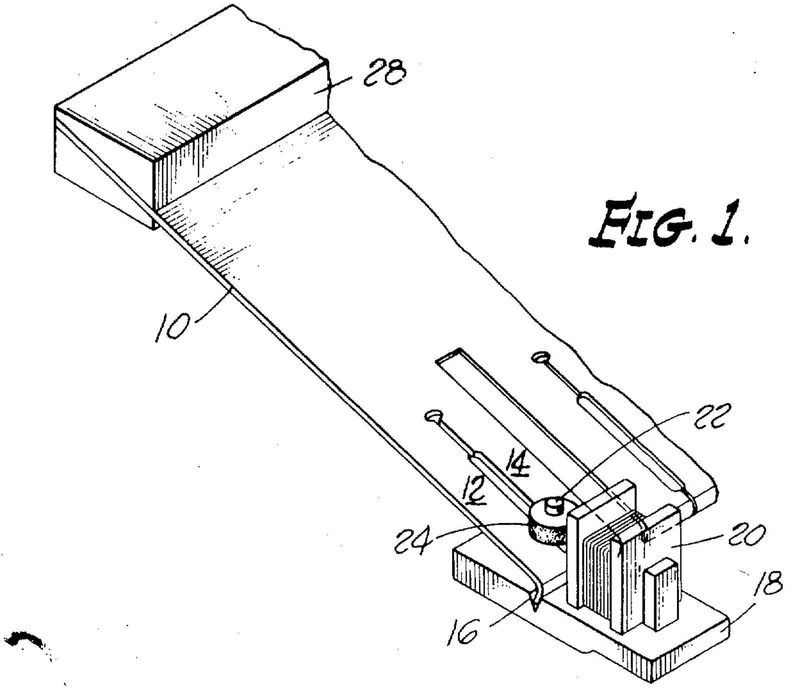

INVENTOR.
WILLARD J. OPOCENSKY
BY
ATTORNEY

SPRING MOUNTING FOR FLYING MAGNETIC HEAD

When a magnetic disc is rapidly rotated, a thin film or air adjacent the disc surface flows with the moving disc. This laminar flow is often used to support magnetic transducers which must be positioned very close to the magnetic medium on the disc surface. The magnetic transducers are mounted in bearing pads which generally have a planar bearing surface designed to fly or ride on the laminar flow and therefore at some very small spacing from the surface of the magnetic medium. When the rotating disc is not rotating, the bearing pads may rest upon the surface of the disc, and when the disc starts rotating, the bearing pads may either be raised by some retraction mechanism, or may be designed to lift off the surface by the laminar flow and without the use of retraction mechanisms.

Because the laminar airflow upon the disc surface generates a pressure which tends to force the transducer bearing pad further from the surface, it is necessary that a spring tension be applied to the bearing pad to force the pad toward the disc surface. The spring used to apply this downward force must be designed to permit certain movements of the magnetic transducer while restricting other movements. In order to follow irregularities in the disc surface, the magnetic transducer must be permitted to roll around its longitudinal axis and to pitch around its lateral axis. To maintain its position in its track on the memory disc and to maintain its proper alignment in that track, the transducer must be prevented from side movement along its lateral axis and must be prevented from any rotational yaw around its vertical axis. One type of prior art method of accomplishing this is to provide a bearing pad with horizontal pins extending from the sides of the pads. One end of a leaf spring is rigidly attached to a structural member of the memory assembly; the opposite end of the spring is bifurcated and is formed to grasp the horizontal pins extending from the bearing pads. Such a system is adequate if there is a large spacing between adjacent bearing pads; however, if the spacing between adjacent pads is relatively close, the horizontally placed pins would interfere with each other and render it very difficult to remove or to change transducers.

Briefly described, the present invention includes a leaf spring rigidly mounted on one end to a fixed member and having a pair of tines that are bent to vertically engage a V-slot in the top surface of a bearing pad. To prevent the bearing pad from becoming disengaged from the bifurcated spring, a dowel pin is embedded in the top surface of the bearing pad and extends through the slot which forms the bifurcation of the spring. The bearing pad is thus permitted motion along its vertical axis, rotation about its lateral axis, and rotation about its longitudinal axis; the bearing pad is restricted against yaw around its vertical axis, motion along its lateral axis, and motion along its longitudinal axis.

Figure 2:
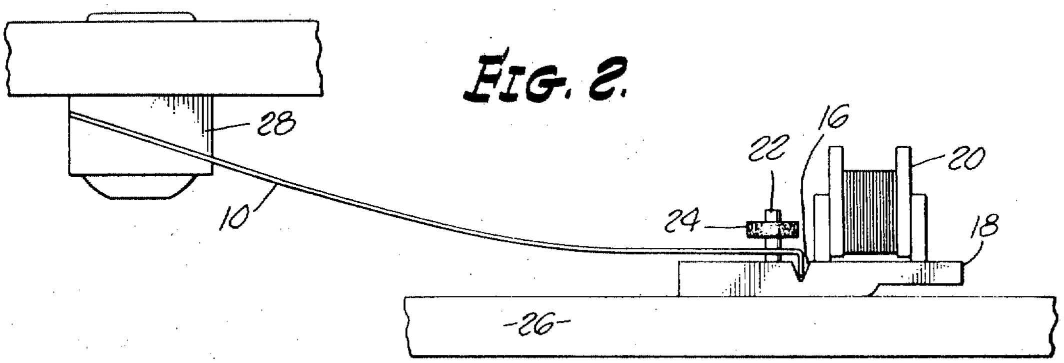

In the drawings, which illustrate a preferred embodiment of the invention:

FIG. 1 is a perspective view illustrating a leaf spring containing a bifurcated spring and a broken section of a second spring; and FIG. 2 is a side elevation view illustrating the support of a bearing pad by the bifurcated spring in operational position.

Turning now to a detailed description, FIG. 1 illustrates a leaf spring element 10 comprising a bifurcated section adapted to engage a bearing pad 18 which support a magnetic transducer. As shown in FIG. 1, the bifurcated section comprises tines 12 and 14 which are identical in size and shape and which are bent near their tips to engage a V-slot 16 cut in the top surface of the bearing pad 18. Bearing pad 18 contains a magnetic transducer 20 which is shown in FIG. 1 for illustrative purposes only and which forms no part of this invention.

Vertically mounted in the top surface of bearing pad 18 is a dowel pin 22 which may be positioned at any convenient point along the longitudinal center line of bearing pad 18 so that it engages the slot separating tines 12 and 14. If the slot separating tines 12 and 14 is of insufficient width to permit dowel pin 22 from loosely engaging it, the slot should be widened as necessary so that pin 22 is permitted free movement within the slot.

In order to prevent the transducer assembly from becoming disengaged from the bifurcated leaf spring 10, it is advisable to attach a resilient rubber or plastic washer 24 to the pin 22. This washer 24 should be placed near the upper end of pin 22 so that it will not interfere with the operation of the spring 10.

As shown in FIG. 1, the bifurcated spring is mounted in a rectangular mounting block 28 which may be provided with a diagonal cut or slot so that the spring 10 is permanently mounted at an appropriate angle to the mounting block 28. When flying head assembly is positioned adjacent a movable magnetic memory element 26, as shown in FIG. 2, the diagonal cut in block 28 will assure that the spring member 10 exerts the proper downward force against the bearing pad 18 so that the bearing pad will position the recording gap of the transducer 20 to very close proximity to the recording medium. In this working position, it is apparent that the bearing pad 18 will be permitted to move in a vertical direction and also to roll about its lateral and longitudinal axes to follow mechanical runout of the disc, but the restraining action of the spring will prevent movement in the longitudinal and lateral directions and also rotation about the vertical axis of the transducer assembly.

What is claimed is:

1. A spring mounting for a magnetic transducer bearing pad comprising:

a bearing pad having a first surface adapted to float on the laminar air flow of a rotating disc, and a second surface opposite to said first surface, said second surface having a lateral V-slot;

a bifurcated leaf spring, one end of said spring being rigidly mounted to a stationary member, the other end having tines formed to vertically engage the V-slot in the second surface of said bearing pad; and means coupled to said second surface of said bearing pad and to said bifurcated spring for restraining said bearing pad from lateral movement with respect to said bifurcated spring.

2. The spring mounting claimed in claim 1, wherein said means comprises a dowel pin vertically positioned on the longitudinal centerline of said bearing pad, and engaging the slot between the tines of said bifurcated spring.

* * * * *